(12) United States Patent
Williams et al.

(10) Patent No.: US 9,622,458 B2
(45) Date of Patent: Apr. 18, 2017

(54) TWO-PART SELF-RIGHTING PET TOY WITH INTERNAL GRIPPER PETALS

(71) Applicant: Schoggi, Inc., Bozeman, MT (US)

(72) Inventors: Spencer Williams, Bozeman, MT (US);
Scott Ogeka, Belgrade, MT (US);
Stephen Sanford, Bozeman, MT (US)

(73) Assignee: Schoggi, Inc., Bozeman, MT (US)

( * ) Notice: Subject to any disclaimer, the term of this patent is extended or adjusted under 35 U.S.C. 154(b) by 364 days.

(21) Appl. No.: 14/492,004

(22) Filed: Sep. 20, 2014

(65) Prior Publication Data

US 2016/0081305 A1 Mar. 24, 2016

(51) Int. Cl.
*A01K 29/00* (2006.01)
*A01K 15/02* (2006.01)

(52) U.S. Cl.
CPC .................................. *A01K 15/026* (2013.01)

(58) Field of Classification Search
USPC ........... 119/702, 707–711; D30/160; 446/69, 446/71, 75, 76, 86, 125, 325, 475; 473/595, 594, 612; 273/288–291
See application file for complete search history.

(56) References Cited

U.S. PATENT DOCUMENTS

| | | | |
|---|---|---|---|
| D388,559 S | 12/1997 | Mauldin, Jr. | |
| 5,778,825 A * | 7/1998 | Krietzmen | A01K 15/025 119/708 |
| 5,813,366 A | 9/1998 | Mauldin, Jr. | |
| 5,984,098 A * | 11/1999 | Cahen | A63H 33/00 206/457 |
| D420,056 S | 2/2000 | Mauldin, Jr. | |
| 6,167,841 B1 * | 1/2001 | Ho | A01K 5/0114 119/57.91 |
| D546,508 S | 7/2007 | Robertson | |
| 7,389,748 B2 * | 6/2008 | Shatoff | A01K 15/025 119/702 |
| D642,342 S * | 7/2011 | Shatoff | D30/160 |
| D658,817 S * | 5/2012 | Costello | D30/121 |
| D658,825 S | 5/2012 | Wolfe, Jr. et al. | |
| 8,225,747 B2 * | 7/2012 | Markham | A01K 15/025 119/51.01 |
| 8,464,666 B2 | 6/2013 | Chefetz et al. | |
| 2005/0045115 A1 * | 3/2005 | Mann | A01K 15/026 119/711 |
| 2011/0083608 A1 * | 4/2011 | Markham | A01K 15/025 119/51.01 |
| 2011/0185980 A1 | 8/2011 | Chefetz et al. | |

FOREIGN PATENT DOCUMENTS

WO WO 2010/039311 * 4/2010 ............... A01K 1/10

* cited by examiner

*Primary Examiner* — Andrea Valenti
(74) *Attorney, Agent, or Firm* — Antoinette M. Tease

(57) ABSTRACT

A pet toy comprising a first part and a second part, each made of a single piece of molded, durable, semi-rigid and flexible material and each comprising a weighted bottom, flared open top that is oval in shape, and plurality of gripper petals extending from the weighted bottom toward the flared open top. Each part comprises a neck area with a plurality of grooves and ridges. The flared open top of the first part fits into the flared open top of the second part and engages with the grooves inside the neck area of the second part. The inner circumference of each successive groove is preferably smaller as the distance from the open flared to increases.

2 Claims, 2 Drawing Sheets

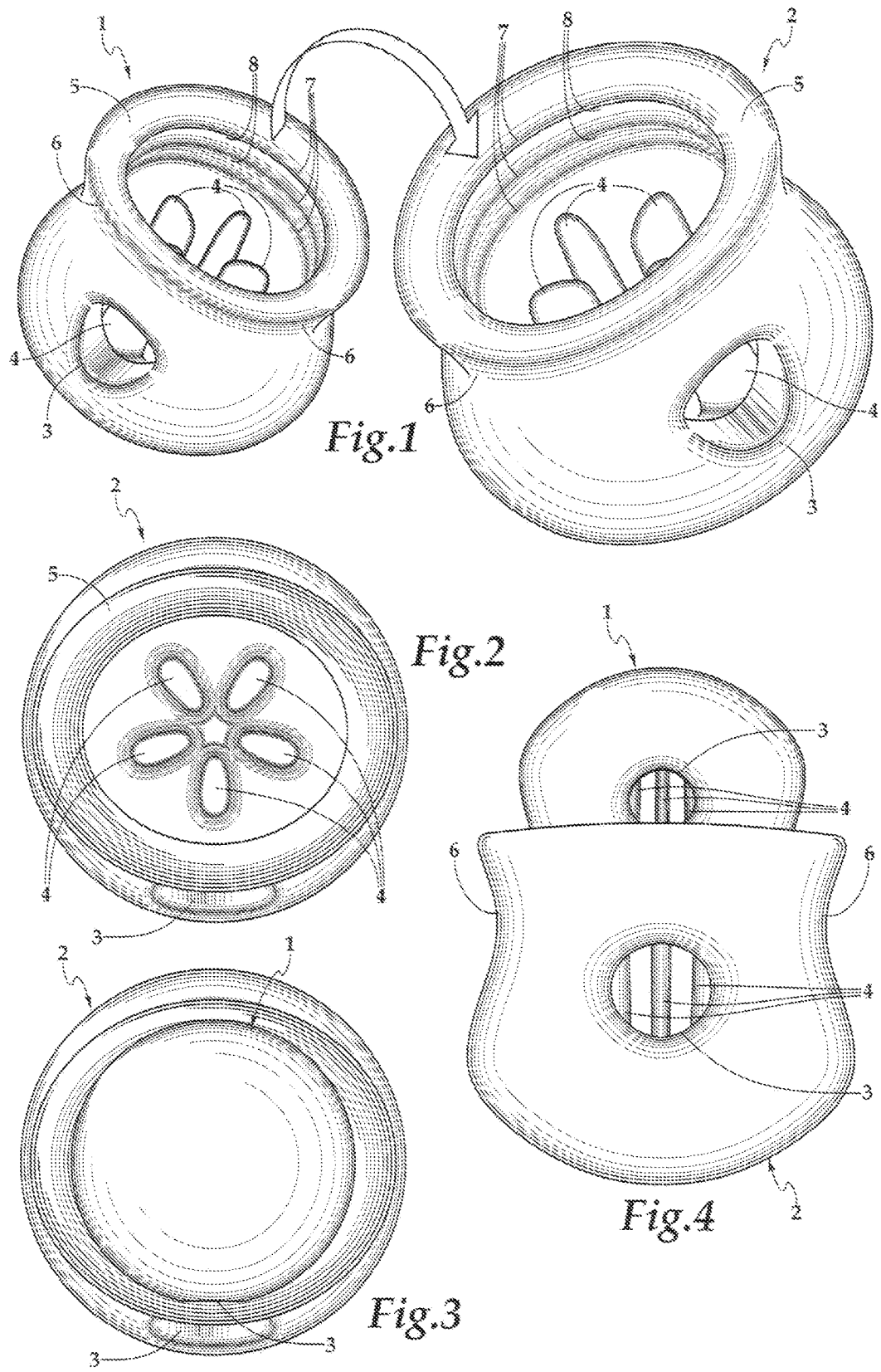

TWO-PART SELF-RIGHTING PET TOY WITH INTERNAL GRIPPER PETALS

BACKGROUND OF THE INVENTION

1. Field of the Invention

The present invention relates generally to the field of pet toys, and more specifically, to a pet toy comprised of two parts, one of which fits into the other, each part, having a plurality of internal upwardly extending gripper petals, a series of grooves and ridges that extends around the circumference of the inside of each part to facilitate the interlocking of the parts, a window and a flared trip perimeter.

2. Description of the Related Art

Many dogs need mental stimulation and engagement to keep them entertained. Pet toys with recesses for finding and extracting treats exist. With practice, a canine can figure out how to get to treats out of these toys more quickly, reducing the toy's entertainment value and useful life. Examples of such toys include U.S. Pat. No. 5,813,366 (Mauldin, Jr., 1998) (disclosing an animal toy with gripping shafts, gripping spines and holding grooves for accepting and containing a variety of sizes of treats) and U.S. Pat. No. D388,559 (Mauldin, Jr., 1997) for the design of the same toy; U.S. Pat. No. D420,056 (Mauldin, Jr., 2000) (depicting a saucer-shaped pet toy design with gripping splines and holding grooves similar to those found in the '366 patent); U.S. Pat. No. D658,825 (Wolfe, Jr., et al., 2012) (showing a pet toy design in the shape of a honeypot with a plurality of external ribs); and U.S. Pat. No. 8,464,66 (Chefetz et al., 2013) (providing a pet chew toy in the shape of a ball with opening that lad into interior chambers inside the body of the ball); see also U.S. Pat. No. D546,508 (Robertson, 2007) (illustrating a toy designed for horses in which a cartridge containing a lick treat is inserted and clicked into a round outer housing).

The present invention is unlike any of the pet toys described above in that it comprises two parts, each of which has a plurality of internal gripping petals that extend upward from the bottom of the part toward the open top. The open top of each of the two parts is flared outward to allow for better interlocking between the two parts. Inside of each part and directly beneath the flared top are a plurality of grooves and ridges. These grooves and ridges facilitate the fitting of the smaller part into the larger part and allow the degree of interlock between the two parts to be adjusted. The window in each part gives pets another opportunity through which to access the treat (in addition to the open top). Finally, the weighted bottom on each part causes the part to right itself with the open top combination of structural features.

A primary object of the present invention is to provide dogs with mental stimulation and joy by hiding treats inside a durable molded toy with multiple levels of difficulty and a variety of treat configurations. Another object of the present invention is to provide a two-part toy in which either part functions independently as a toy for hiding treats. Another object of the present invention is to provide a two-part toy in which the two parts fit together to create a puzzle that must be solved in order to access the treat. Another object of the present invention is to provide a method of adjusting the degree of interlock between the two parts to present a greater or lesser challenge to the dog by varying the level of difficulty associated with separating the two parts. Another object of the present invention is to provide a toy in which there is more than one way to access and extract the treat. Another object of the present invention is to provide a toy in which each of the two parts is weighted on the bottom so that the toy rights itself with the open top always facing upward.

BRIEF SUMMARY OF THE INVENTION

The present invention is a pet toy comprising: a part made of a single piece of molded, durable, semi-rigid and flexible material, the first part comprising a weighted bottom, a flared open top, and a plurality of gripper petals extending from the weighted bottom toward the flared open top, the flared open top being oval in shape; and wherein the first part comprises a neck area, a plurality of grooves and ridges inside the neck area of the first part. In a preferred embodiment, each of the gripper petals has a base and a tip, and each of the gripper petals is tapered such that it is wider at the base than at the tip. Preferably, the gripper petals are arranged radially around a center point in the weighted bottom of the part.

In a preferred embodiment, each of the grippe petals has an outer-most edge, the plurality of gripper petals is configured so that there is a space between an inside wall of the part and the outer-most edge of each of the gripper petals, the flared open top of the part has a thickness, and the space is at least as wide as the thickness of the flared open top. Preferably, the part further comprises a tapered midsection with a window that is situated between the weighted bottom and the flared open top.

In a preferred embodiment, each of the gripper petals comprises a tip, and the tip of each gripper petal terminates at a level above the window and beneath the plurality of ridges inside the neck area of the part. Preferably, each groove in the plurality of grooves inside the neck area of the part has an inner circumference, each groove is situated a distance from the open flared top of the part, and the inner circumference of each groove decreases slightly as the distance from the open flared top increases.

In an alternate embodiment, the present invention is a pet toy comprising: a first part made of a single piece of molded, durable, semi-rigid and flexible material, the first part comprising a weighted bottom, a flared open top, and a plurality of gripper petals extending from the weighted bottom toward the flared open top, the flared open top being oval in shape; a second part made of a single piece of molded, durable, semi-rigid and flexible material, the first part comprising a weighted bottom, a flared open top, and a plurality of gripper petals extending from the weighted bottom toward the flared open top, the flared open top being oval in shape; wherein the first part and the second part each comprises a neck area, a plurality of grooves and ridges inside the neck area of the first part and a plurality of grooves and ridges inside the neck area of the second part; and wherein the flared open top of the first part fits into the flared open top of the second part and engages with the grooves inside the neck area of the second part.

In a preferred embodiment, each of the gripper petals in the first and second parts has a base and a tip, and each of the gripper petals is tapered such that it is wider at the base than at the tip. Preferably, the gripper petals in each of the first and second parts are arranged radically around a center point in the weighted bottom of said part.

In a preferred embodiment, each of the gripper petals in the first and second parts has an outer-most edge, the plurality of gripper petals in each of the first and second parts is configured so that there is a space between an inside wall of said part and the outer-most edge of each of the gripper petals, the flared open top of the first part and the flared open top of the second part each has a thickness, and the space in each of the first and second parts is at least as wide as the thickness of the flared open top of said part. Preferably, each of the first and second parts further comprises a tapered midsection with a window that is situated between the weighted bottom and the flared open top of said part.

In a preferred embodiment, each of the gripper petals in the first and second parts comprises a tip, and the tip of each gripper petal terminates at a level above the window and beneath the plurality of ridges inside the neck area of said part. Preferably, each groove in the plurality of grooves inside the neck area of each of the first and second parts has an inner circumference, each groove is situated a distance from the open flared top of said part, and the inner circumference of each groove decreases slightly as the distance from the open flared top increases.

BRIEF DESCRIPTION OF THE DRAWINGS

FIG. 1 is a perspective view of the first and second part of the present invention.

FIG. 2 is a top view of the second part of the present invention.

FIG. 3 is a top view of the first part inserted into the top of the second part of the present invention.

FIG. 4 is a front view of the first part inserted into the second part of the present invention.

REFERENCE NUMBERS

Figure 6:
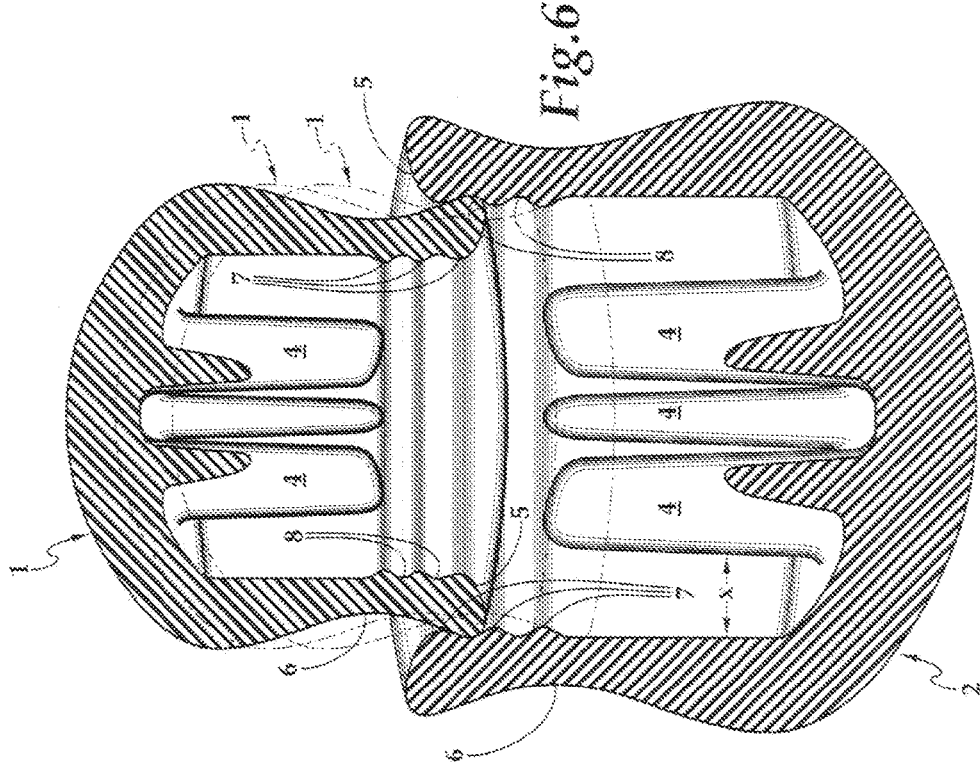
FIG. 6 is a section view of the first and second pans of the present invention with the first part inserted into the second part.

1 First part
2 Second part
3 Window
4 Gripper petals
5 Flared open top
6 Neck area
7 Ridge
8 Groove
9 Weighted bottom

DETAILED DESCRIPTION OF INVENTION

FIG. 1 is a perspective view of the first and second part of the present invention. This figure shows the first part 1 and the second part 2 of the invention. Subject to the caveats set forth below, these two parts are virtually identical except that the first part 1 is a scaled-down (i.e., smaller) version of the second part 2. The invention is designed so that either part may be used alone, or the first part may be inserted into the second part. Although the two parts are drawn here as virtually identical, in a preferred embodiment, the first part 1 differs from the second part in the following respects: (1) the first part 1 is slightly wider proportionately than the second part 2; (2) the window 3 on the first part 1 is lower and wider than on the second part 2; (3) the gripper petals 4 in the first part 1 are proportionately somewhat shorter than the gripper petals 4 on the second part 2; and (4) the wall thickness is proportionately greater overall on the first part 1 than on the second part 2. These relatively minor differences between the two parts are not discernible in the patent drawings.

Each of the first and second parts 1, 2 is roughly shaped like honeypot, with a rounded bottom, a tapered midsection (that comprises the window 3), a neck area 6, and a flared open top 5. Just inside the flared open top 5 are a plurality of ridges 7 and grooves 8. The purpose of these ridges 7 and grooves 8 shall become apparent in connection with FIGS. 5 and 6. The bottom 9 of each part 1, 2 is preferably weighted (by means of the thickness and shape of the material) to prevent the part from toppling over when placed on a flat surface: in other words, each part 1, 2 is designed with a low center of gravity so that it will tend to pop back up rather than fall over. The weighted bottom 9 of the parts 1, 2 causes each part to right itself so that the open top 5 always face upward. This self-righting feature makes it more of a challenge for the dog to extract the treat from the toy because the dog cannot simply knock the toy over and lick the treats out.

The window 3 has several different purposes. The first purpose is to allow a dog to look in through the window and see the treat contained within the toy. A second purpose is to allow the dog to access the treat when the two parts are locked together (that is, with the first part inserted into the top of the second part, as shown in FIG. 6). A third purpose is to provide another way for treats to be inserted into the toy, that is, via the window 3.

Inside each of the first and second parts 1, 2 are a plurality of gripper petals 4. These gripper petals 4 are arranged radially around a center point in the bottom of the part, and they extend upward toward the open top 5. Each of the petals 4 is preferably the same height. The top end of the petals 4 terminates at a level slightly above the top of the window 3 and just beneath the peak of the lowest-most ridge 7. In addition, the gripper petals 4 are preferably configured so that there is a space (labeled "X" in FIG. 6) between the inside wall of the part and the outer-most edge of each petal. This space is preferably at least as wide as the thickness of the flared open top 5 of the first part 1 so that the open top 5 may be inserted down into the second part 2 to a point at which the open top 5 is lower than the top of the petals 4 (see FIG. 6).

The gripper petals 4 are instrumental in helping to retain the treats within the toy and extend the dog's interest in the toy. When the two part 1, 2 are locked together (see FIG. 6), the gripper petals 4 prevent the treats from easily falling out of the window 3. They also prevent dry and wet treats from being easily licked out, thereby making the puzzle more interesting for longer periods of time.

FIG. 2 is a top view of the second part of the present invention. As shown in this figure, the petals 4 are preferably tapered so that they are somewhat thicker at the bottom and thinner at the top. This figure also shows the relative flaring of the top 5 and bottom 9 of each part 1, 2. As shown here, the bottom 9 is preferably slightly more flared (outward) than the top 5. Note also that although the bottom 9 has a circular shape, the top 5 preferably has a slightly oval shape. This is to assist in "locking" the first part 1 into the top of the second part 2. If the first part 1 is inserted into the top of the second part 2 such that the oval shape of the top of each part is aligned, the first part 1 can then be rotated within the second part 2 (thereby disaligning the two oval shapes) to create an even tighter fit between the two parts.

FIG. 3 is a top view of the first part inserted into the second part of the present invention.

FIG. 4 is a front view of the first part inserted into the second part of the present invention. This figure shown the windows 3 vertically aligned, although this would not necessarily have to be the case (the first part 1 could be rotated within the second part 2). Note that the parts as shown in this figure correspond to the position show in FIG. 6; in other words, the top 5 of the first part 1 rests just beneath the first ridge 4 on the inside of the neck area 6 of the second part 2.

Figure 5:
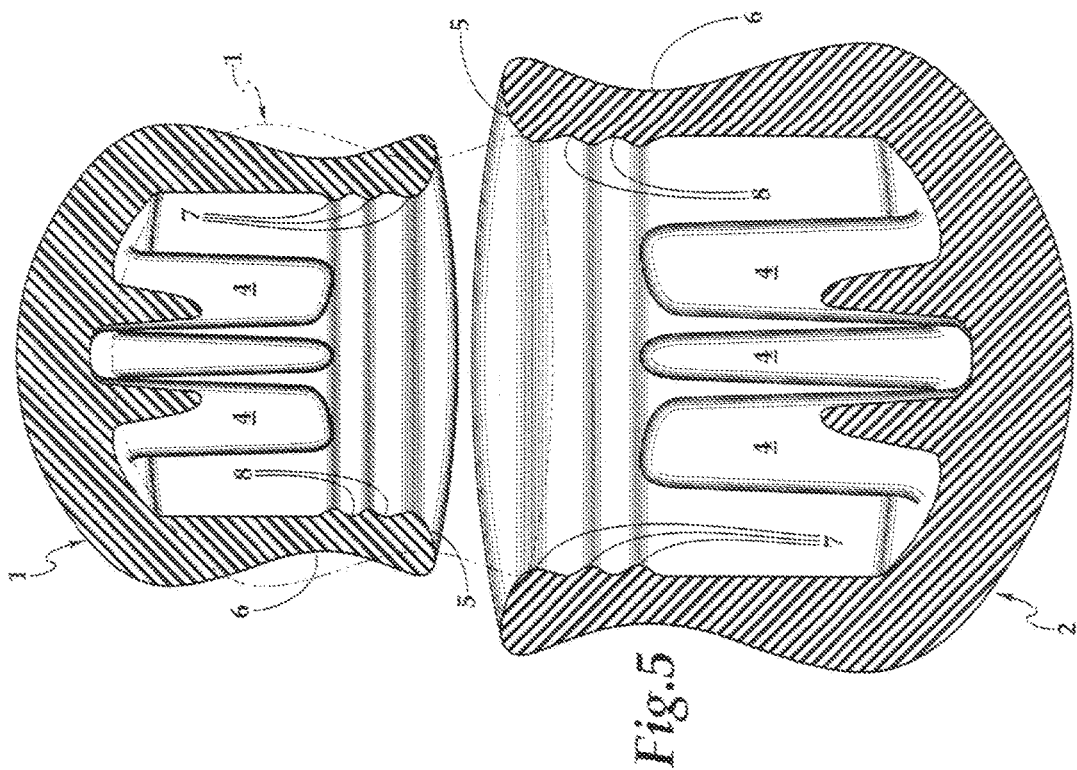
FIG. 5 is a section view of the first and second parts of the present invention prior to the first part being inserted into the second part.

FIG. 5 is a second view of the first and second parts of the present invention prior to the first part being inserted into the second part. To insert the first part 1 into the second part 2, the first part 1 is turned upside-down (as shown) so that the flared open top 5 of the first part 1 can be inserted into the flared open top 5 of the second part 2. The flared top 5 of the first part 1 combined with the ridges 7 and grooves 8 inside the neck area 6 of the second part create and interlock between the first and second parts 1, 2. The degree of interlock between the two parts is adjustable; the top 5 of the first part 1 may be pressed into the second part 2 so that the top 5 of the first part 1 rests inside the first groove 8 in the neck area 6 of the second part 2, or it may be pressed down even further so that it rests inside the second groove 8 (which is directly beneath the first groove in FIG. 6). The first part 1 may be pressed down yet further so that the top 5 of the first part 1 rests beneath the third ridge 7 in the neck area 6 of the second part 6. The present invention is not limited to any particular number of ridges and grooves; however, it should be understood that by providing a series of ridges and grooves inside the neck area 6 of the second part 2, the degree of interlock between the first and second parts 1, 2 is adjustable.

FIG. 6 is a section view of the first and second parts of the present invention with the first part inserted into the second part. Another structural feature of the present invention is that the lower the first part is pressed down into the second part, the tighter the fit between the two parts becomes. This is because each successive groove 8 (moving downward) inside the neck area 6 of the second part 2 has a slightly smaller inside circumference than the previous groove 8 (this aspect is too subtle to be detected visually in the patent figures). Thus, the fit between the two parts 1, 2 can be tightened in two different ways—first, by rotating the first part 1 within the second part 2 so that the oval shapes of the top ends of the two parts are no longer aligned (as described above), and second, by pushing the first part further down into the second part, as just described.

Note that the pet treats (dry or wet) may be inserted into either part 1, 2 in between, around and on top of the gripper petals 4. The gripper petals 4 retain at least a portion of the treats and make it more difficult for the dog to extract them from the toy. The toy itself is preferably a single molded part comprised of a durable, semi-rigid yet flexible material such as ZOGOFLEX® manufactures by West Paw Design of Bozeman, Mont. In a preferred embodiment, this material also floats so that the toy may be thrown into a body of water for a dog to retrieve.

Although the preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. A pet toy comprising:
   (a) a first part made of a single piece of molded, durable, semi-rigid and flexible material, the first part comprising a weighted bottom, a flared open top, and a plurality of gripper petals extending from the weighted bottom toward the flared open top; and
   (b) a second part made of a single piece of molded, durable, semi-rigid and flexible material, the second part comprising a weighted bottom, a flared open top, and a plurality of gripper petals extending from the weighted bottom toward the flared open top;
   wherein the first part is configured to be inserted into the flared open top of the second part so that the first and second parts align vertically;
   wherein the first part and the second part each comprises a neck area, a plurality of grooves and ridges inside the neck area of the first part and a plurality of grooves and ridges inside the neck area of the second part;
   wherein the flared open top of the first part fits into the flared open top of the second part and engages with the grooves inside the neck area of the second part;
   wherein each of the gripper petals in the first and second parts has a base and a tip, and each of the gripper petals is tapered such that it is wider at the base than at the tip;
   wherein the gripper petals in each of the first and second parts are arranged radially around a center point in the weighted bottom of said part;
   wherein each of the gripper petals in the first and second parts has an outer-most edge, wherein the plurality of gripper petals in each of the first and second parts is configured so that there is a space between an inside wall of said part and the outer-most edge of each of the gripper petals, wherein the flared open top of the first part and the flared open top of the second part each has a thickness, and wherein the space in each of the first and second parts is at least as wide as the thickness of the flared open top of said part;
   wherein each of the first and second parts further comprises a tapered midsection with a window that is situated between the weighted bottom and the flared open top of said part;
   wherein each of the gripper petals in the first and second parts comprises a tip, and the tip of each gripper petal terminates at a level above the window and beneath the plurality of ridges inside the neck area of said part;
   wherein each groove in the plurality of grooves inside the neck area of each of the first and second parts has an inner circumference, wherein each groove is situated a distance from the flared open top of said part, and wherein the inner circumference of each groove decreases slightly as the distance from the flared open top increases; and
   wherein the weighted bottom of each of the first and second parts is circular in lateral cross-section, and the flared open top of each of the first and second parts is oval in lateral cross-section so as to facilitate the inter-locking of the first and second parts.

2. The pet toy of claim 1, wherein the overall dimensions of the first part are smaller than the overall dimensions of the second part;
   wherein the first part is wider proportionately than the second part;
   wherein the window on the first part is lower and wider than the window on the second part;
   wherein the gripper petals in the first part are proportionately shorter than the gripper petals on the second part; and wherein each of the first and second parts has a wall thickness, and the wall thickness of the first part is proportionately greater overall than the wall thickness of the second part.

* * * * *